United States Patent [19]
Sato

[11] 3,913,106
[45] Oct. 14, 1975

[54] RADAR DETECTION APPARATUS FOR PREVENTING VEHICULAR COLLISIONS

[75] Inventor: Kazuo Sato, Toyota, Japan

[73] Assignee: Toyota Jidosha Kogyo Kabushiki Kaisha, Tokyo, Japan

[22] Filed: June 18, 1974

[21] Appl. No.: 480,483

[30] Foreign Application Priority Data
June 18, 1973 Japan.................................. 48-67854

[52] U.S. Cl...................................... 343/9; 343/14
[51] Int. Cl.² ............................................ G01S 9/24
[58] Field of Search ........................ 343/7 VM, 9, 14

[56] References Cited
UNITED STATES PATENTS
3,750,171 7/1973 Faris ........................................ 343/9
3,750,172 7/1973 Tresselt............................... 343/9 X
3,766,554 10/1973 Tresselt................................. 343/14

Primary Examiner—T. H. Tubbesing
Attorney, Agent, or Firm—Toren, McGeady and Stanger

[57] ABSTRACT

Radar apparatus is disclosed in which the relative speed and relative distance between a vehicle and a target are determined so as to prevent vehicular collisions. A two-frequency Doppler system is employed in which signals at the two different frequencies are transmitted to the target. Doppler signals corresponding to the transmitted signals are generated, and the oscillator switches between the two frequencies in response to the level of the generated Doppler signals. The time corresponding to a half period of one of the Doppler signals and to the phase difference between the Doppler signals are generated.

11 Claims, 11 Drawing Figures

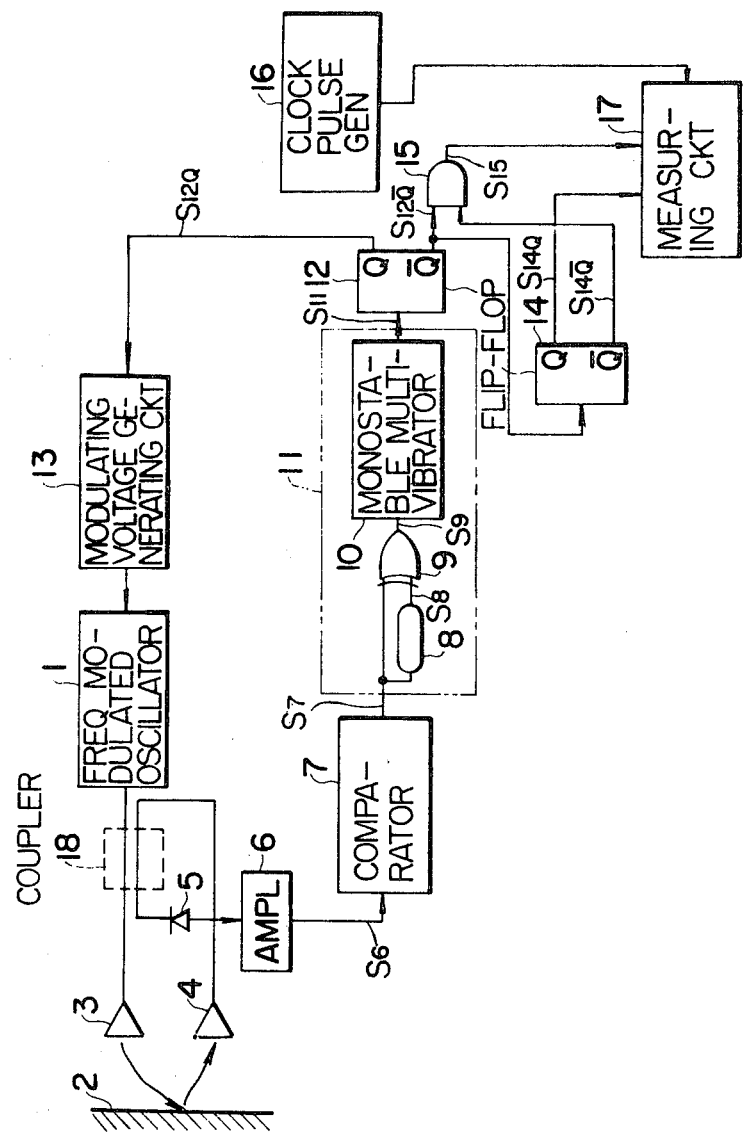

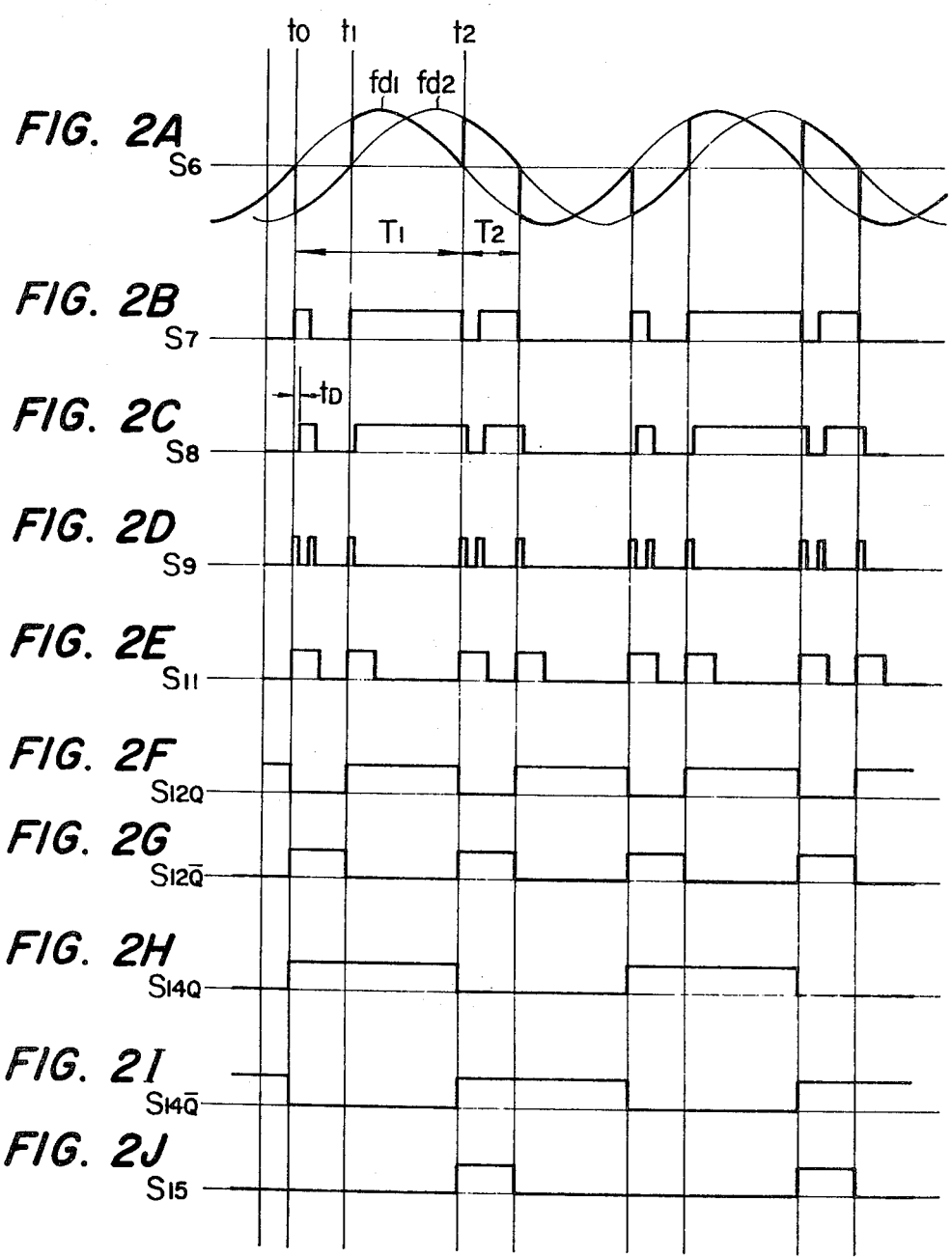

RADAR DETECTION APPARATUS FOR PREVENTING VEHICULAR COLLISIONS

BACKGROUND OF THE INVENTION

This invention relates to vehicular collision prevention scheme, and more particularly, to radar equipment employing Doppler signal precessing techniques in which the relative speed and relative distance between a vehicle and target are determined.

There presently exists vehicular collision prevention schemes in which Doppler signal processing techniques are employed. In these prior art schemes, there are employed two frequencies which are transmitted to the target being sensed. Each of the frequencies is transmitted consecutively, with changing over between the two frequencies occurring at specified periods. Two Doppler signals are generated by combining part of the transmitted waves and received waves to a mixing detection system. Thereafter, the two Doppler signals are separated by a synchronous detector which is synchronized with the change-over time periods when the transmitted frequency changes from one to the other of the two frequencies employed. The signals separated by the synchronous detector circuit are shaped into continuous wave forms by low-pass filters. After this signal processing, the relative speed is detected from the period of one of the Doppler signals, and the relative distance is detected from the phase difference between both of the Doppler signals. From these values, the possibility of collision is determined, and therefore, is prevented by suitable warning systems.

In these prior art devices, the transmitted waves are continuously switched between one and the other frequencies independent of the presence or absence of the danger of a collision. Generally, frequencies approximately 100 times as high as the Doppler signal frequencies are required for the change-over and the required frequency bandwidth utilized is quite wide. Additionally, an oscillator is employed for the frequency change-over, and the detector circuit as well as the filter circuit can be complex and unreliable in operation.

An object of the invention is to improve such anti-collision devices.

An object of the present invention is to provide an improved vehicular collision prevention apparatus.

Another object of this invention is to provide a simplified Deoppler signal processing system in which the relative distance and speed between a target and vehicle can be determined.

Still another object of this invention is to provide such a collision prevention apparatus in which the bandwidth required for the Doppler system is significantly less than that of the prior art.

Yet another object of this invention is to provide such a vehicular collision scheme employing two frequencies, in which frequency change-over between the two frequencies is not commenced until the vehicle and target are relatively close.

SUMMARY OF THE INVENTION

According to a feature of the invention, these objects are attained in whole or in part by switching between frequencies only at the zero phases of the Doppler signals.

According to another feature the switching between frequencies is indicated only when the object being detected lies within a danger zone.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1 is a block diagram illustrating an embodiment of the radar equipment of the present vehicular collision prevention scheme;

FIGS. 2A to 2J show a series of waveforms existing at specified points to the embodiment illustrated in FIG. 1.

DETAILED DESCRIPTION OF THE INVENTION

Referring to FIG. 1, there is shown an embodiment of the present invention in which an oscillator 1 is employed; the oscillator is provided with a frequency modulator capable of selectively producing, as will be described later, a signal or wave having frequency $f_1$ or $f_2$. The output of the oscillator 1 is connected to a transmitting antenna 3 which radiates the wave having frequency $f_1$ or $f_2$ generated by oscillator 1 toward a target 2. The wave generated by antenna 3 directed toward the target 2 is reflected therefrom and received by a receiving antenna 4. The output of the receiving antenna 4 is connected to a mixing dector 5, that detector being a conventional homodyne detector. Many conventional devices can be used for the homodyne detection, and, for instance, a conventional 3-port circulator can be employed. A directional coupler 18 (as indicated in dotted lines) is connected between the oscillator 1 and the detector 5. A portion of the signal directed to the target 2 is provided to the mixing detector 5, and the transmitted and received waves are mixed and subjected to the conventional homodyne detection. The homodyne detector mixes and converts the two frequencies into a beat frequency or Doppler signal. The frequency of the Doppler signal is approximately proportional to the velocity component of the object and direction of the antenna. For an oncoming object or a receding object traveling radially and with respect to the antenna, the relative velocity is proportional to the Doppler frequency. At the output of detector 5, a Doppler signal $f_{d1}$ or $f_{d2}$ is generated related to the frequency $f_1$ or $f_2$ produced by oscillator 1.

The output of detector 5 is applied through an amplifier 6 to a comparator 7, the comparator 7 detecting the zero crossover points of the Doppler signal $f_{d1}$ or $f_{d2}$ generated at the output of detector 5. The output of comparator 7 is connected to a frequency-change-over trigger signal-generating circuit 11, which is responsive to the sensing of the Doppler signal $f_{d1}$ or $f_{d2}$ crossing the zero potential level. The comparator 7 could be considered as a level-sensing means which is sensitive to the Doppler signals crossing a predetermined voltage level. In the present instance, the voltage level crossover is at zero volts.

The frequency changing-over trigger signal-generating circuit 11 comprises a delay circuit 8 having its input connected to the output of comparator 7 and having its output connected to one input of an anti-coincidence circuit or gate 9. The other input of two-input anti-coincidence circuit 9 receives the output of comparator 7, and the output of circuit 9 is connected to a monostable multivibrator 10. Elements 8, 9 and 10 form the frequency change-over trigger-signal-generating circuit 11. The output of this circuit 11 is applied to a gate input of a flip-flop 12 having complementary outputs Q and $\bar{Q}$. The normal output Q of flip-flop 12 is connected to the input of a modulating voltage-generating circuit 13, the output of which is connected to the input of oscillator 1. The complementary output $\bar{Q}$ of flip-flop 12, that is the output appearing at $\bar{Q}$ is applied as one input to a two-input AND circuit 15. The $\bar{Q}$ output is also applied as an input to a flip-flop 14, having complementary outputs Q and $\bar{Q}$. The second input of two-input AND circuit 15 is provided with the $\bar{Q}$ output of flip-flop 14. The output of AND circuit 15 is applied as the input to measuring circuit 17, the measuring circuit also being provided with the Q output of flip-flop 14 and the output of a clock pulse generator 16.

The operation of the embodiment of the present invention as illustrated in FIG. 1 will now be explained with reference to the wave forms illustrated in FIG. 2. It is noted that various points in the block diagram of FIG. 1 are made reference to with letters; these letters are carried forth corresponding to the respective wave forms at those points in FIG. 2.

The generated Doppler signal $f_{d1}$ or $f_{d2}$ produced by detector 5 and amplified by amplifier 6 is illustratively shown at $S_6$ in FIG. 2A. The Doppler signals $f_{d1}$ and $f_{d2}$ are sinusoidal in shape having approximately equal time periods, that is the time periods shown as $T_1$, that time period being inversely proportional to the relative speed of the vehicle. A time $T_2$ in waveform $S_6$ relates to the phase difference between the Doppler signals $f_{d1}$ and $f_{d2}$ and is directly proportional to the relative distance between the target and vehicle. The zero crossing of each of Doppler signals $f_{d1}$ and $f_{d2}$ is detected by comparator or level sensor 7, When the Doppler signal $f_{d1}$ crosses the zero potential at time $t_o$, the transmitting wave frequency produced in the oscillator 1 changes from $f_1$ to $f_2$, as will be described later. The transmitting frequency wave remains at frequency $f_2$ until a time $t_1$ which is the time at which the Doppler signal $f_{d2}$ crosses the zero level. At time $t_1$, the transmitting wave frequency changes from $f_2$ to $f_1$. The transmitting frequency wave $f_1$ continues until a time $t_2$ which corresponds to the Doppler signal $f_{d1}$ crossing the zero potential level from a positive value. At this time $t_2$ the transmitting wave frequency changes again from $f_1$ to $f_2$. Thereafter, the transmitting wave generated by oscillator 1 continues to switch between $f_1$ and $f_2$ as the zero crossing level for Doppler signals $f_{d1}$ and $f_{d2}$ is sensed. The combined waveform as discussed above is illustrated as $S_6$ in FIG. 2A.

The signal $S_7$ appearing at the output of comparator 7 is applied as one input directly to the anit-coincidence circuit 9 of the frequency change-over trigger signal-generating circuit 11. The delay circuit 8, applied with the output $S_7$ of the comparator 7, produces the wave signal $S_8$ with a time delay $t_D$ for the other input to the circuit 9. A series of pulses having a duration corresponding to the time delay $t_D$ as the output $S_9$ of circuit 9 are applied to the monostable multivibrator 10 which generates a series of trigger pulses having a suitable duration as illustrated by waveform $S_{11}$. The trigger pulses occur at the zero crossings of the respective Doppler signals, it being noted that any other voltage level could be chosen as that level to be crossed. The series of trigger pulses $S_{11}$ are applied to the input of flip-flop 12, the output of which is a pulse waveform illustrated by waveform $S_{12Q}$, the complementary output $S_{12\bar{Q}}$, which is illustrated in FIG. 2G, appearing at the $\bar{Q}$ output of flip-flop 12. Each time the trigger pulse $S_{11}$ appears at the output of trigger circuit 11, the modulating voltage-generator circuit 13 causes the frequency at which oscillator 1 is operating to switch from one to the other of the two frequencies transmitted thereby.

At the Q terminal of flip-flop 14, wave form $S_{14Q}$ is produced which is representative of the time period of the Doppler signals. Since the Doppler signals are approximately equal in frequency, especially with respect to time period, the time interval $T_1$ can be considered to correspond to the Half-period of the Doppler signal $f_{d1}$. Waveform $S_{15}$ is produced as the output of AND circuit 15, that waveform having a pulse duration which is representative of the phase difference between Doppler signals $f_{d1}$ and $f_{d2}$. Measuring circuit 17 receives a series of pulses from clock pulse generator 16, the number of which are controlled by the pulse durations as represented by the waveform $S_{12\bar{Q}}$. Thus, a computation is made as to the time period of the sensed Doppler signals and the phase difference therebetween, so that the relative speed and relative distance between the target and vehicle can be determined.

As illustrated above and in accordance with the present invention, the frequency oscillator 1 changes between frequencies $f_1$ and $f_2$ in response to the voltage level of the Doppler signal produced at the output of amplifier 6. Therefore, the changeover frequency need be only four times as high as the Doppler signal frequency, and the occupying frequency band of the waves or signals transmitted by oscillator 1 can be significantly less than that obtained with the prior art. Additionally, the instant invention provides an improved and simplified method in which to determine the values necessary for generating the relative speed and relative distance between a vehicle and a target. Thus, the complex detector circuits, filter circuits and other complex circuitry required with the prior art devices are eliminated.

Rather than deriving the half-period of the Doppler signal as represented by the waveform $S_{14Q}$, the full period may be determined for arriving at the relative speed and other values necessary for preventing vehicular collision. Additionally, it is possible to control the preset voltage level for comparison in the comparator 7, so that the present apparatus will not operate for small targets whose intensity of the reflecting waves is low. As can be understood, the present apparatus will not commence changing between the frequency levels until the Doppler voltage level reaches a predetermined magnitude so as to be able to detect zero crossings. Thus, the switching between the frequencies only commences when the danger zone is pierced or penetrated. This danger zone is such so as to cause a significant Doppler signal to be generated so as to activate the apparatus illustrated in FIG. 1.

That the invention as illustrated in the embodiment of FIG. 1 operates to derive the relative distance between the target and vehicle and relative speed therebetween can be illustrated by the following mathematical derivation.

The frequencies $f_{d1}$ and $f_{d2}$ obtained related to the transmitting waves of frequency $f_1$ and $f_2$ are illustrated in equations 1 and 2 shown below.

$$f_{d1} = 2\,v f_1/c, \quad (1)$$

$$f_{d2} = 2\,v f_2/c \quad (2)$$

Where $v$ is the relative speed and $c$ is the propagation speed of light. Since $f_1$ is approximately equal to $f_2$, $f_{d1}$ is approximately equal to $f_{d2}$. A time $T_1$ corresponding to the half-period of the Doppler signals is, as shown in the equations 3 and 4 below where $K_1$ is a constant related to the transmitting frequencies $f_1$ or $f_2$, which are shown below.

$$T_1 = \frac{1}{2 f_{d1} = (\text{or } 2 F_{d2})} = \frac{c}{4\,v f_1\,(\text{or } 4\,v f_2)} \quad (3)$$

$$= \frac{K_1}{v} \quad (4)$$

The angular frequencies of the Doppler signals is indicated below in equations 5 and 6 with $\omega_1$ $\omega_2$ being the angular frequencies of the transmitting waves.

$$\omega_{d1} = 2\pi f_{d1} = \frac{2\,v\,\omega_1}{c} \quad (5)$$

$$\omega_{d2} = 2\pi f_{d2} = \frac{2\,v\,\omega_2}{c} \quad (6)$$

It is assumed that the angular frequency difference $\Delta\omega$ satisfies the relationship that $\Delta\omega \ll \omega_1$, $\omega_1 \approx \omega_2$ and, therefore, $\omega_{d1} \approx \omega_{d2}$ The phase difference $\Delta\phi$ of the angular frequencies of the Doppler signals is as illustrated in equation 7 listed below $$\Delta\phi = 2\,(\omega_2 - \omega_1)\,r/c - 2\,r\,\Delta\omega/c \quad (7)$$

where $r$ is the relative distance between the target and vehicle.

A time $T_2$ corresponding to the phase difference between the Doppler signals is illustrated in equation 8, which is below.

$$T_2 = \frac{\Delta\phi\,T_1}{\pi} = \frac{2\,r\,\Delta\omega T_1}{\pi c} = K_2\,r\,T_1 \quad (8)$$

Therefore, the relative speed $v$ is determined by determining the time $T_1$ corresponding to the half-period of the Doppler signal, and the constant $K_1$ is related to the transmitting wave frequency $f_1$ or $f_2$, that being divided by the detected value. The relative distance $r$ is determined by finding the time $T_2$ corresponding to the phase difference of the Doppler signals such that the time $T_2$ is divided by the product between the time $T_1$ corresponding to half-period of the Doppler signal and the constant $K_2$ which is dependent upon the angular frequency difference $\Delta\omega$ of the transmitting waves.

Thus, the apparatus illustrated in the embodiment of FIG. 1 enables the relative distance and relative speed between the target and vehicle to be determined in a simple yet efficient and improved fashion with respect to the prior art.

While specific embodiments of the invention have been shown and described in detail to illustrate the application of the inventive principles, it will be understood that the invention may be embodied otherwise without departing from such principles.

What is claimed is:

1. Radar detection apparatus for preventing vehicular collisions in which relative speed and relative distance between a vehicle and a target are determined utilizing Doppler signal characteristics in which two transmitting waves of different frequencies are employed, the relative speed and relative distance being determined by using the period of the Doppler signals and the phase difference between two generated Doppler signals, said apparatus comprising oscillator means capable of generating either of two signals of different frequencies at a time for transmission to the target, detector means for generating Doppler signals corresponding to each of said two frequencies, level sensing means connected to said detector means for sensing the level of the Doppler signals generated by said detector means, and control means for changing said oscillator means to transmit a signal having the other of said two frequencies when the level of said Doppler signal applied to said level sensing means crosses a predetermined voltage level.

2. Radar detection apparatus as set forth in claim 1, comprising signal generating means connected to said level sensing means for generating a signal having a duration related to the period of said Doppler signal applied to said level sensing means and for generating a signal having a duration related to the phase difference between said two generated Doppler signals derived from respective signals of said two different frequencies produced by said oscillator means.

3. Radar detection apparatus as set forth in claim 2, comprising measuring means connected to said signal generating means, clock means connected to said measuring means to apply a number of clock pulses corresponding to the durations of said signals produced by signal generating means relating to said period and said phase difference.

4. Radar detection apparatus set forth in claim 1, wherein said control means comprises a modulating-voltage generator for generating signals to change the frequency of the signal produced by said oscillator from one to the other of said two frequencies.

5. Radar detection apparatus as set forth in claim 1, comprising a trigger circuit connected to said level sensing means for generating a trigger signal each time either of said Doppler signals crosses said predetermined voltage level.

6. Radar detection apparatus as set forth in claim 5, wherein said level sensing means comprises means for sensing when said Doppler signal crosses a zero voltage level.

7. Radar detection apparatus as set forth in claim 1, wherein said level sensing means comprises a comparator, said control means comprising a trigger circuit connected to said comparator for providing a trigger signal each time said comparator senses the Doppler signal applied thereto crosses a predetermined level, a first flip-flop connected to said trigger circuit for generating a signal having a duration related to the phase difference between the respective Doppler signals generated corresponding to the two transmitting waves at different frequencies.

8. Radar detection apparatus as set forth in claim 7, comprising a second flip-flop connected to one of the outputs of said first flip-flop to generate a signal having a duration related to the period of the Doppler signal applied to said comparator.

9. Radar detection apparatus as set forth in claim 1, comprising means defining a danger zone between said target and said vehicle, said oscillator means continuously producing a transmitting wave of only one frequency until said danger zone is penetrated.

10. A Doppler signal system in which signals at two different frequencies are transmitted to a target and Doppler signals are generated corresponding to said two different frequencies, said system comprising means for switching between said two different frequencies in response to the voltage levels of said Doppler signals.

11. A Doppler signal system as set forth in claim 10, wherein the distance between a vehicle and said target is determined by the periods of said Doppler signals and the phase difference therebetween, said system further comprising pulse generation means for generating two pulse signals having durations corresponding to said periods and said phase difference, respectively.

* * * * *